United States Patent [19]
Seto

[11] Patent Number: 5,463,490
[45] Date of Patent: Oct. 31, 1995

[54] LIGHT BEAM DEFLECTING DEVICE

[75] Inventor: Masanori Seto, Saitama, Japan

[73] Assignee: Fuji Xerox Co., Ltd., Tokyo, Japan

[21] Appl. No.: 29,546

[22] Filed: Mar. 11, 1993

[30] Foreign Application Priority Data

Mar. 12, 1992 [JP] Japan .................................. 4-087509

[51] Int. Cl.[6] .................................................. G02B 26/08
[52] U.S. Cl. ............................ 359/200; 359/216; 310/90; 384/490; 384/491
[58] Field of Search ...................................... 359/200, 198, 359/216–219, 212; 384/91–93, 452–454, 490–492, 494–497, 544; 310/90, 109

[56] References Cited

U.S. PATENT DOCUMENTS

| | | | |
|---|---|---|---|
| 4,609,251 | 9/1986 | Nakaoka et al. | 359/200 |
| 5,002,243 | 3/1991 | Kraus et al. | 248/68.1 |
| 5,138,477 | 8/1992 | Omura et al. | 359/200 |
| 5,245,234 | 9/1993 | Okada et al. | 359/198 |
| 5,274,288 | 12/1993 | Stefansky | 310/90 |

FOREIGN PATENT DOCUMENTS

| | | |
|---|---|---|
| 61-151881 | 7/1986 | Japan . |
| 63-49725 | 3/1988 | Japan . |
| 64-74316 | 3/1989 | Japan . |
| 2-99910 | 4/1990 | Japan . |
| 3-54515 | 3/1991 | Japan . |

*Primary Examiner*—Paul M. Dzierzynski
*Assistant Examiner*—James Phan
*Attorney, Agent, or Firm*—Finnegan, Henderson, Farabow, Garrett & Dunner

[57] ABSTRACT

In a light beam deflecting device for deflecting a laser beam by using a rotary polygon mirror, the rotary shaft of the rotary polygon mirror is rotatably supported by a plurality of ball bearings which, when turned, vibrate at different frequencies, thus producing no beat sound.

5 Claims, 5 Drawing Sheets

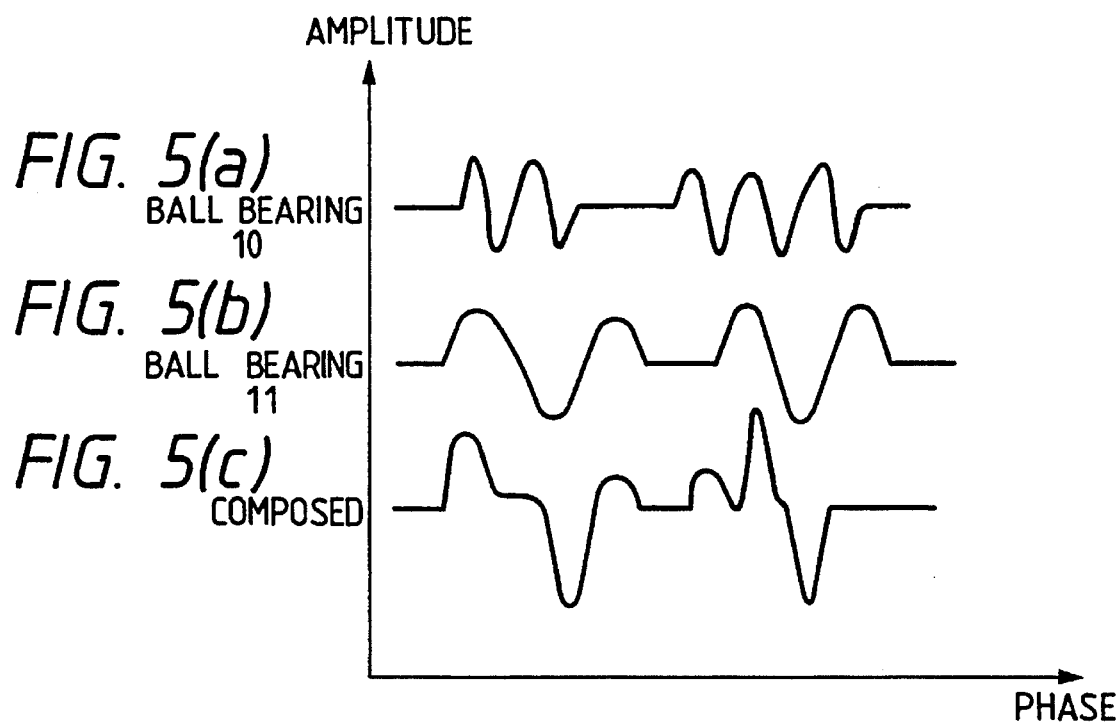
FIG. 5(a) BALL BEARING 10
FIG. 5(b) BALL BEARING 11
FIG. 5(c) COMPOSED
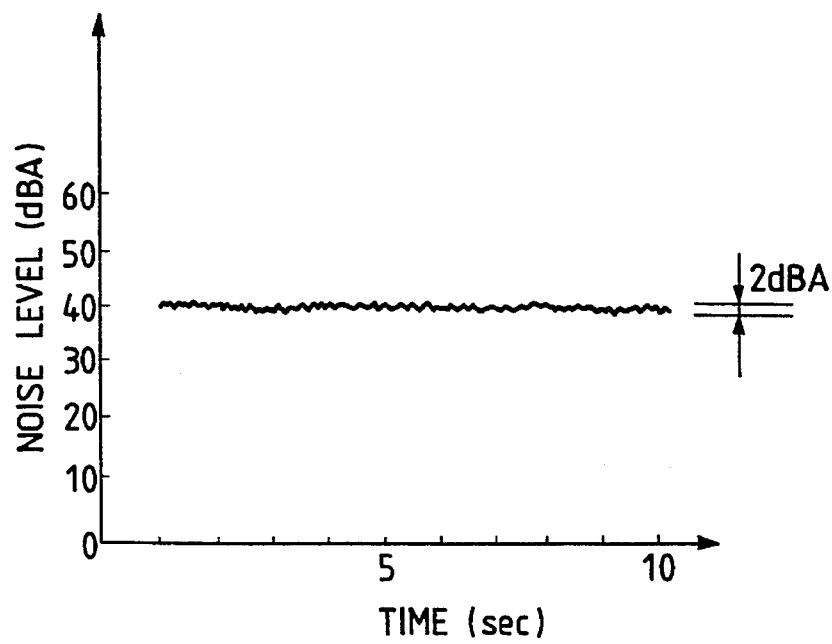
FIG. 6

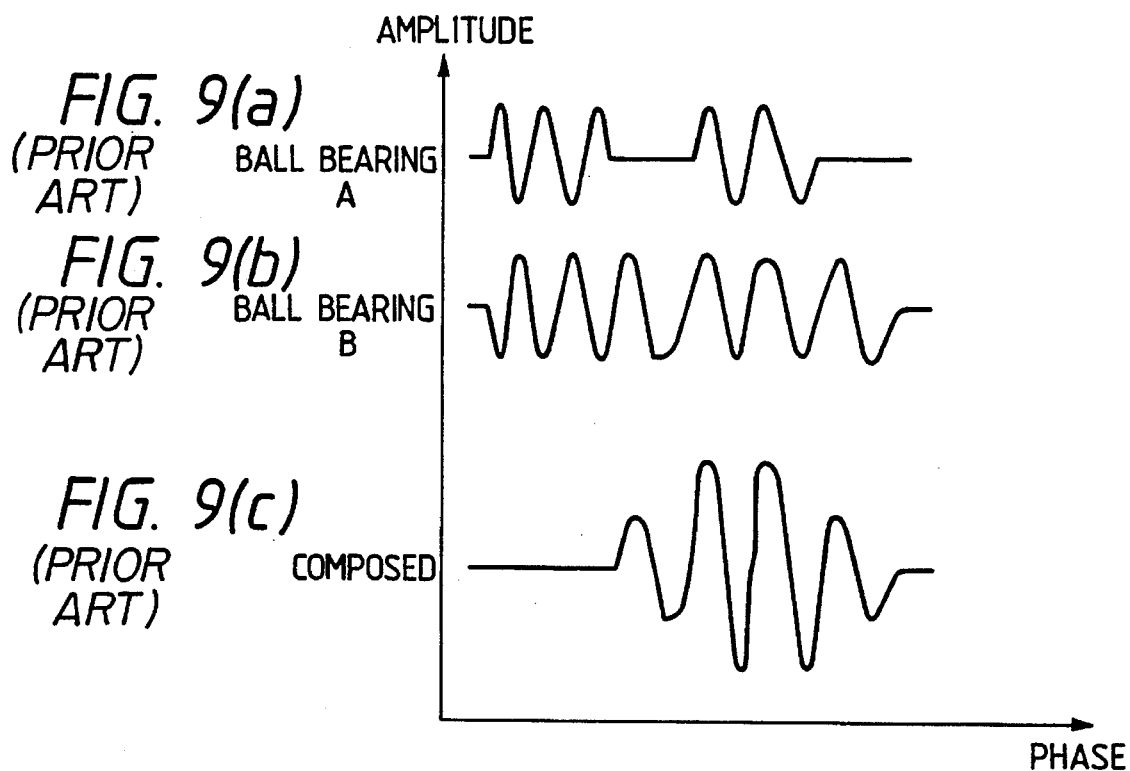

LIGHT BEAM DEFLECTING DEVICE

BACKGROUND OF THE INVENTION

1. Technical Field

This invention relates to a light beam deflecting device provided for an image recording device such as a laser printer and a digital copier and which employs a rotary polygon mirror to deflect the output laser beam of a laser beam generator, and more particularly to an improvement of such a light beam deflecting device.

2. Background Art

A conventional light beam deflecting device of this type is designed, for instance, as follows: In the device, a laser beam outputted by a semiconductor laser is applied through a condenser lens to a rotary polygon mirror, so that it is deflected while being reflected by the rotary polygon mirror, so as to scan a photoreceptor drum axially with the aid of an image forming lens.

The rotary polygon mirror is connected directly to a drive motor; that is, it is driven directly by the motor. The rotary shaft of the drive motor is rotatably supported by ball bearings.

It is well known in the art that the ball bearings supporting the rotary shaft of the rotary polygon mirror vibrate as the rotary shaft rotates (cf. "Vibration Engineering Handbook", pp. 973 to 986).

The vibrations of the ball bearings attribute, for instance, to the springs of them, to the manufacture of them, and to unsatisfactory handling of them.

In the case where the ball bearings vibrate because of the springs of them, the vibrations are due to the passage of the rolling elements, to the elastic characteristic of the bearings, or to the critical speed of the rotary shaft. In the case where the vibrations of the ball bearings depend on the manufacture of the bearings, they are produced by the finished surface which is swelled, or they attribute to the vibrations of the holders of the ball bearings. Furthermore, in the case where the vibrations attribute to the unsatisfactory handling of the bearings, the latter have scratches, or dust is held therein.

When the ball bearings supporting the rotary shaft of the rotary polygon mirror are vibrated in the above-described manner, they produce sounds with frequencies in the audio frequency band audible to the ear. The acoustic vibration in the audio frequency band causes the light beam deflecting device to make noise to some extent. The acoustic vibration occurs steadily when the rotary shaft is turned at high speed, and therefore it is not so serious when it is turned at a low speed of the order of 2000 rpm, or when the device is used alone.

The ball bearings supporting the rotary shaft of the rotary polygon mirror are turned at high speed, and a plurality of the same ball bearings are employed for supporting the rotary shaft. Hence, the acoustic vibrations in the audio frequency band of those ball bearings are equal in frequency and different in phase as shown in FIGS. 9(a) to 9(c). Therefore, the acoustic vibrations interfere with one another, thus producing beat sounds. The beat sounds thus produced are offensive to the ear, varying in amplitude with time. When the beat sounds are produced, particularly in an image recording apparatus such as a laser printer, the recorded image is adversely affected thereby because the beat sounds vibrate the laser beam which is deflected by the rotary polygon mirror in a scanning mode.

In general, an image recording apparatus such as a laser printer is set on a desk in an office or the like when used. Therefore, the beat sounds produced by the image recording apparatus will be offensive to the ear even if they are small in sound volume.

In order to eliminate the difficulty that the ball bearings produce beat sounds in the above-described manner, techniques have been proposed by Japanese Patent Unexamined Publication (OPI) Nos. Sho. 61-151881 and Sho. 64-74316 (the term "OPI" as used herein means an "unexamined published application").

The technique proposed by Japanese Patent Unexamined Publication (OPI) No. Sho. 61-151881 concerns a magnetic disk device comprising a magnetic disk and a magnetic head. In the magnetic disk device, a needle bearing and a ball bearing are provided for a rotary actuator adapted to position the magnetic head with respect to the magnetic disk, and therefore the acoustic vibrations produced by those bearings are different in frequency from one another, which prevents the production of beat sounds.

The technique proposed by Japanese Patent Unexamined Publication (OPI) No. Sho. 64-74316 concerns a disk type memory device including a spindle assembly which comprises: a spindle; and at least one rolling bearing which rotatably supports the spindle. In the device, the number of rolling elements in the rolling bearing is set substantially to an even-number times the ratio of the diameter of the outer or inner raceway track of the rolling bearing to the diameter of the pitch circle of the rolling elements, so that the rotation-asynchronous vibration is decreased.

In the above-described magnetic disk device, production of the beat sounds can be prevented to some extent. However, it is not practical to apply the device to a light beam deflecting device in which a rotary polygon mirror is rotated at high speed, about 20,000 rpm, because the device employs the needle bearing.

The disk type memory device is advantageous in that the rotation-asynchronous vibration is decreased; however, it still suffers from a difficulty that production of the beat sounds cannot be effectively prevented.

SUMMARY OF THE INVENTION

In view of the foregoing, a first object of the invention is to provide a light beam deflecting device in which, even when the rotary polygon mirror is rotated at high speed, production of the beat sounds can be effectively prevented.

In addition, a second object of the invention is to provide a drive device in which, even when a rotary shaft member of the drive device is rotated at high speed, production of the beat sounds can be effectively prevented.

The foregoing first object of the invention has been achieved by the provision of a light beam deflecting device including a laser beam generator for generating a light beam, a rotary polygon mirror for deflecting the light beam, and a plurality of ball bearing members for supporting a rotary shaft of the polygon mirror rotatably, wherein the ball bearing members are so designed that vibrations which the ball bearings produce when rotated are different in frequency from one another.

The foregoing second object of the invention has been achieved by the provision of the drive device including, drive motor including a rotary shaft, and a plurality of ball bearing members for supporting the rotary shaft member of the drive device, wherein the ball bearing members are so designed that vibrations which the ball bearings produce when rotated are different in frequency from one another.

In the light beam deflecting device of the invention, the ball bearings supporting the rotary shaft of the rotary polygon mirror vibrate in different frequencies when turned. That is, the acoustic vibrations of the ball bearings are different in frequency. Hence, the device is free from the difficulty that the acoustic vibrations interfere with one another to produce beat sounds.

In the drive device of the invention, the ball bearings supporting the rotary shaft of the drive device vibrate in different frequencies when turned. That is, the acoustic vibrations of the ball bearings are different in frequency. Hence, the device is free from the difficulty that the acoustic vibrations interfere with one another to produce beat sounds.

The nature, principle, and utility of the invention will be more clearly understood from the following detailed description of the invention when read in conjunction with the accompanying drawings.

BRIEF DESCRIPTION OF THE DRAWINGS

In the accompanying drawings:

FIGS. 5(a), 5(b) and 5(c) are a waveform diagram for a description of vibrations produced by the ball bearings;

FIG. 6 is a graphical representation for a description of the result of a test given to the light beam deflecting device of the invention;

FIGS. 9(a), 9(b) and 9(c) are a waveform diagram for a description of vibrations produced by the conventional device.

DETAILED DESCRIPTION OF THE INVENTION

Preferred embodiments of the invention will be described with reference to the accompanying drawings.

Figure 2:
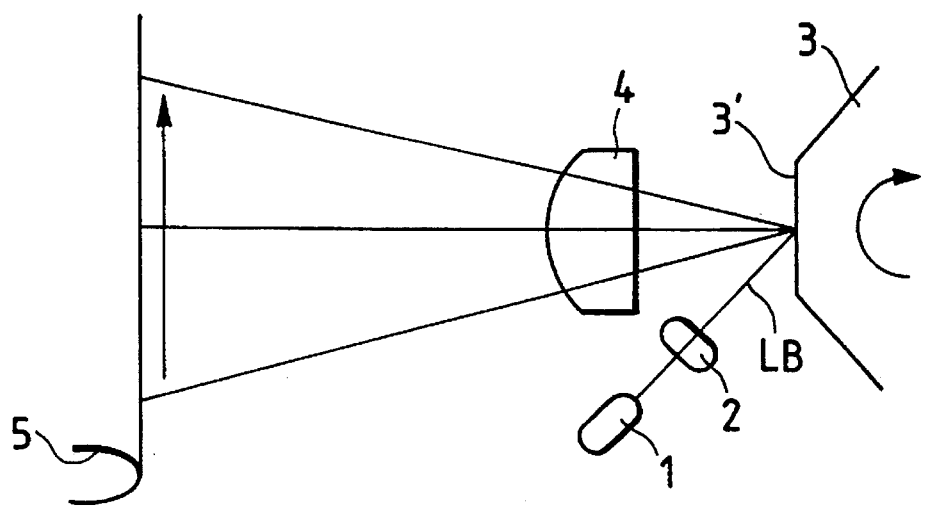
FIG. 2 is an explanatory diagram showing the arrangement of an image recording apparatus to which the light beam deflecting device of the invention is applicable.

FIG. 2 shows an image recording apparatus to which a light beam deflecting device is applicable which constitutes a first embodiment of the invention.

In FIG. 2, reference numeral 1 designates a laser beam generator, namely, a semiconductor laser. The output laser beam LB of the semiconductor laser 1 is applied through a condenser lens group 2 to a rotary polygon mirror 3. The condenser lens group 2 is to convert the laser beam LB into a parallel light beam while concentrating it.

The rotary polygon mirror 3 is rotated in the direction of the arrow at a predetermined speed by a drive motor as follows: The rotary polygon mirror 3 is regular polygon in plan view, and its sides are all mirrors 3'. Therefore, the laser beam LB applied to the rotary polygon mirror 3, while being reflected by the mirrors 3', is image-formed on a photoreceptor drum 5 with the aid of an image-forming lens 4. In this operation, the mirrors 3' of the rotary polygon mirror 3 are moved as the latter 3 is turned. Hence, as the rotary polygon mirror 3 is rotated, the laser beam LB reflected by each of the mirrors 3' scans the surface of the photoreceptor drum 5 axially (in the main scanning direction).

The surface of the photoreceptor drum 5 has been charged uniformly by a charger (not shown). Therefore, when the surface thus charged is scanned with the laser beam LB in accordance with given image data, an electrostatic latent image is formed on it. The electrostatic latent image thus formed is developed into a visible image by a conventional electrophotographic process. The visible image is transferred onto a recording sheet and fixed. Thus, the image recording operation has been achieved.

In the device, the rotary shaft of the rotary polygon mirror is rotatably supported by a plurality of ball bearing members, which produce vibrations different in frequency from one another when turned.

Figure 1:
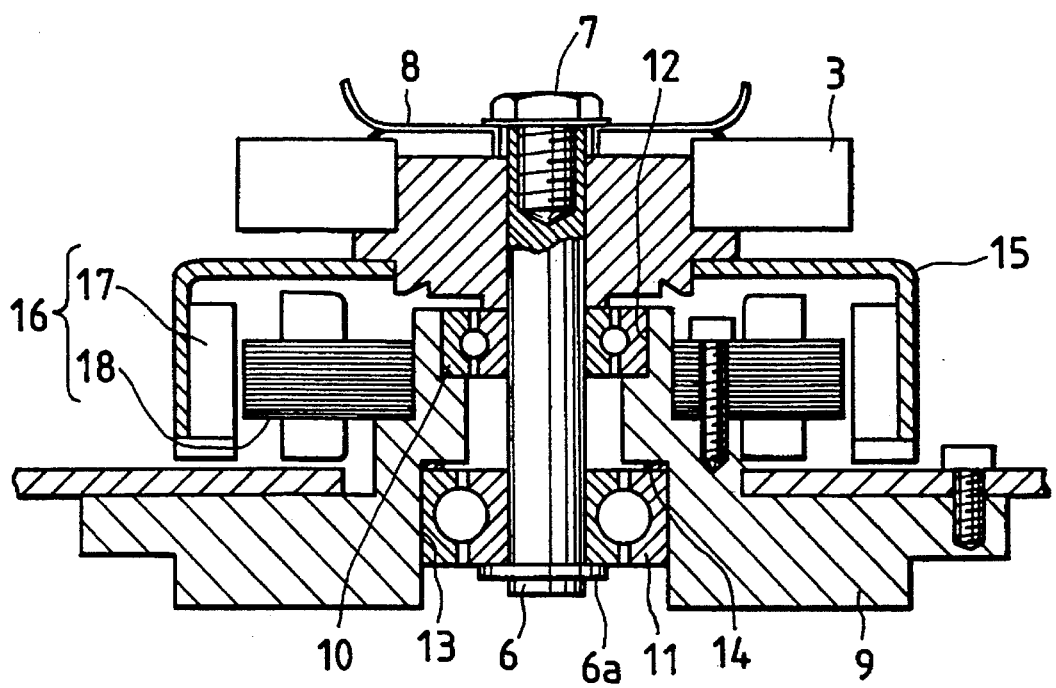
FIG. 1 is a sectional view showing an example of a light beam deflecting device, which constitutes a first embodiment of the invention.

More specifically, as shown in FIG. 1, the rotary polygon mirror 3 is put on the upper end portion of the rotary shaft 6, and fixed with a retaining spring 8 which is secured to the upper end portion of the rotary shaft 6. The rotary shaft 6 of the rotary polygon mirror 3 is rotatably supported by two ball bearings 10 and 11 mounted on a motor housing 9. The ball bearing 10 is positioned above the ball bearing 11. The ball bearing 10 is fixedly fitted in a recess 12 formed in the motor housing 9 or fixedly bonded to it. The ball bearing 11 located below the ball bearing 10 is fixedly fitted in a recess 13 of the motor housing 9 through a wave washer 14 which is to pre-load the ball bearings 10 and 11. The lower end portion of the ball bearing 11 is fixed by a flange 6a formed on the rotary shaft 6.

A rotor 15 is provided under the rotary polygon mirror 3 in such a manner that the former is integral with the latter. The rotor 15 is made up of a cup-shaped frame opened downwardly. Magnets 17 forming the drive motor 16 are mounted on the inner cylindrical surface of the rotor 15, while a stator forming the drive motor 16 is fixedly mounted on the motor housing 9.

The rotary polygon mirror 3 is turned as follows: That is, the rotor 15, to which the magnets 17 of the drive motor 16 has been fixedly secured, is rotated at a predetermined speed by applying current to the stator 18 of the drive motor 16, so that the rotary polygon mirror 3 secured to the rotor 15 is rotated. The rotary polygon mirror 3 is fixedly mounted on the rotary shaft 6 of the drive motor 16, and the rotary shaft 6 is rotatably supported by two ball bearings 10 and 11 which are mounted on the motor housing 9.

Figure 3A:
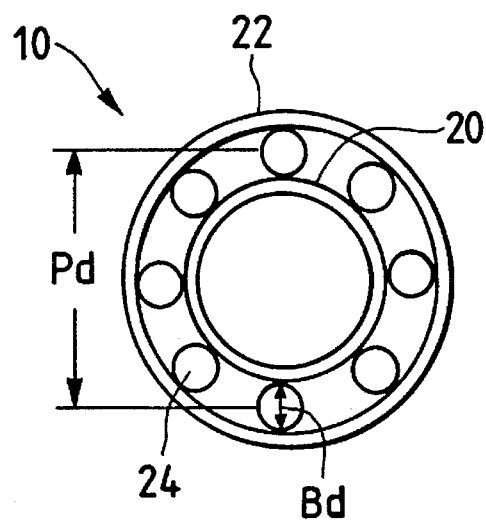
FIGS. 3(a) and 3(b) are front views showing ball bearings in the device shown in FIG. 1.

As shown in FIG. 3(a), the ball bearing 10 includes: an inner race 20 and an outer race 22; rolling elements, namely, balls 24 rotatably held between the races 20 and 22; and a holder (not shown) holding those balls 24. Similarly, the ball bearing 11, as shown in of FIG. 3(b), includes: an inner race 21 and an outer race 23; rolling elements, namely, balls 25 rotatably held between the races 21 and 23; and a holder (not shown) holding those balls 25. Those ball bearings 10 and 11 are so pre-loaded that the inner races 20 and 21 and the outer races 22 and 24 are in contact with the balls 24 and 25 at a contact angle $\phi$ as shown in FIG. 4, respectively. Furthermore, the ball bearings 10 and 11 are so designed that their balls 24 and 25 have different diameters Bd and Bd', and different pitch diameters Pd and Pd', respectively. More specifically, the diameter Bd and the pitch diameter Pd of the balls 24 in the ball bearing 10 are smaller than those Bd' and Pd' of the balls 25 of the ball bearing 11, respectively.

It is well known in the art that the balls bearings 10 and 11 thus constructed vibrate as the rotary shaft 6 is turned. The vibrations of the ball bearings 10 and 11 attribute, for instance, to the springs of them, the manufacture of them, and unsatisfactory handling of them, as was described before. Particularly, the vibrations of the ball bearings are due to defects of the inner races 20 and 21 and the outer races 22 and 23. In this connection, it has been theoretically proven that the frequencies of vibrations due to defects of the inner races 20 and 21 and the outer races 22 and 23 are represented by the following equations (cf. Application 243-1 "Effective Maintenance of Rotary Machine on Vibration Analysis" published by Yokogawa-Hewllett-Packard, Ltd):

The frequency $f_0$ of a vibration due to a defect of the outer race 22 or 23:

$$f_0 = (n/2) \, (rpm/60) \, \{1-(Bd/Pd) \cos\phi\}$$

where n is the number of the balls 24, rpm is the number of revolutions per minute, Bd is the diameter of the balls 24, Pd is the pitch diameter (FIG. 3(a)) and $\phi$ is the contact angle.

Figure 3B:
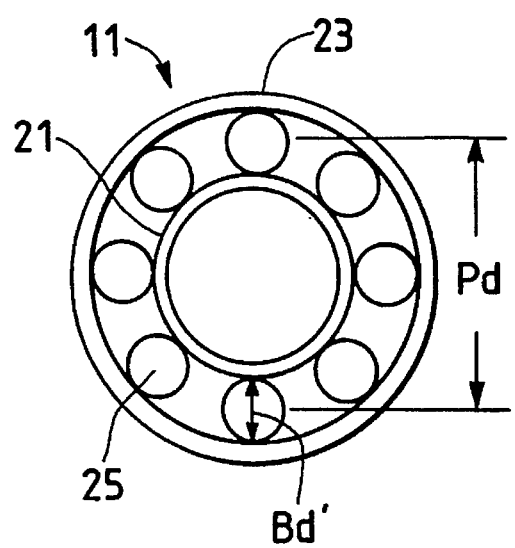
Figure 4:
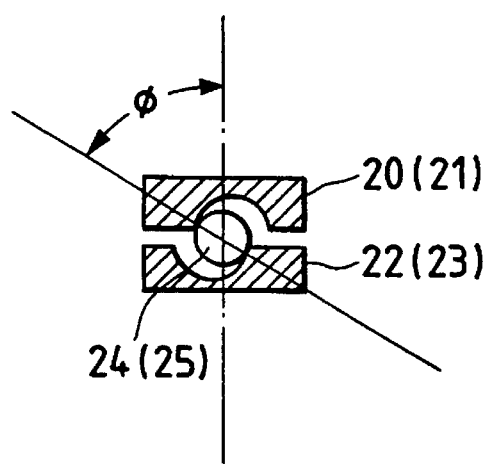
FIG. 4 is an explanatory diagram showing a contact angle of the ball bearings.

The frequency $f_I$ of a vibration due to a defect of the inner race 20 or 21:

$$f_I = (n'/2) \, (rpm/60) \, \{1+(Bd'/Pd') \cos\phi\}$$

where n' is the number of the balls 25, rpm is the number of revolutions per minute, Bd' is the diameter of the balls 25, Pd' is the pitch diameter (FIG. 3(b)) and $\phi$ is the contact angle.

As was described above, the ball bearings 10 and 11 are so designed that the balls 24 and 25 have the different diameters Bd and Bd', and form the different pitch diameters Pd and Pd', respectively, and the diameter Bd and the pitch diameter Pd of the balls 24 in the ball bearing 10 are smaller than those Bd' and Pd' of the balls 25 of the ball bearing 11, respectively. Hence, the frequencies $f_0$ and $f_I$ of vibrations of the ball bearings 10 and 11 due to defects of the outer races 22 and 23 and the inner races 20 and 21 are different as shown in FIGS. 5(a) and 5(b). Therefore, the acoustic vibrations of the ball bearings 10 and 11 are merely composed as shown in FIG. 5(c); that is, they will produce no beat sound.

That is, in the embodiment, the rotary shaft 6 of the rotary polygon mirror 3 is rotatably supported by the two ball bearings 10 and 11 which are so designed that the frequencies $f_0$ and $f_I$ of vibrations are different which they produce when turned. That is, the acoustic vibrations of the ball bearings 10 and 11 are different in frequency from each other. Therefore, the light beam deflecting device of the invention is free from the difficulty that the acoustic vibrations interfere with each other, producing beat sounds.

Thus, even in the case where an image recording apparatus such as a laser printer with the light beam deflecting device of the invention is operated, for instance, on a desk in an office, it will produce no beat sound. That is, the light beam deflecting device of the invention, unlike the conventional one, is free from the difficulty that it produces noises which are offensive to the ear even if being small in sound volume. Therefore, with the device of the invention, the work environment of the office can be protected from being adversely affected by the sounds produced by the image recording apparatus.

In order to confirm the effects of the above-described embodiment, the inventor formed a light beam deflecting device as shown in FIG. 1, and measured the variations in level of the noises produced by the device thus formed.

FIG. 6 shows the results of the measurement. As is apparent from FIG. 6, the noise was is maintained constant in level (the variation being within 2 dBA). In other words, the noise was not variable in level; that is, no beat sound was produced.

Figure 7:
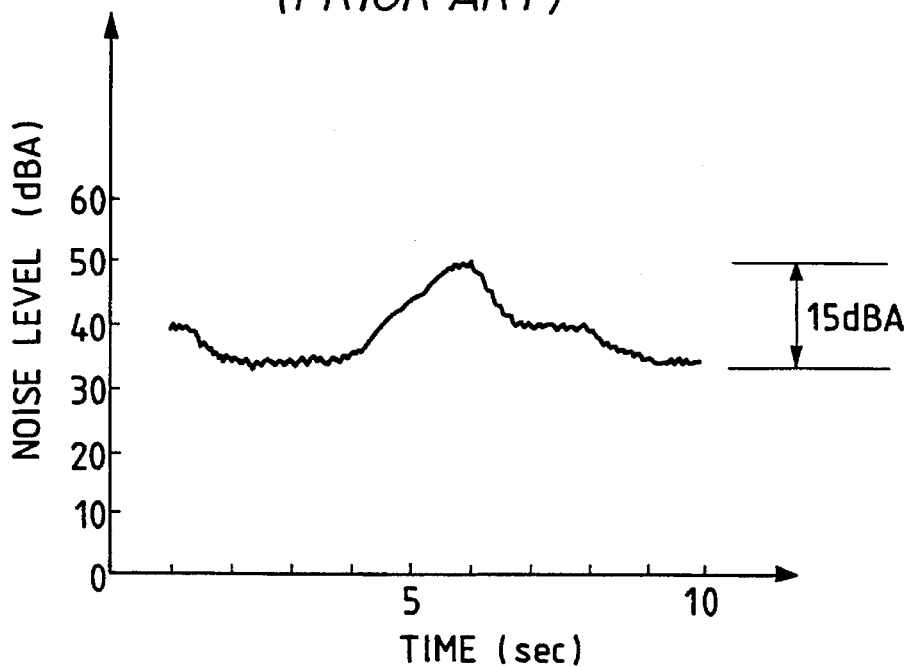
FIG. 7 is also a graphical representation for a description of the result of a test given to a conventional light beam deflecting device.

On the other hand, the result of measurement of the noise produced by the conventional light beam deflecting device using the same ball bearings is as shown in FIG. 7. That is, with the conventional device, the noise varied in level with time (the variation being of the order of 15 dBA).

The frequencies of vibrations produced by the two ball bearings can be changed by designing the latter as follows:

(a) The balls of one of the two ball bearings are made different in diameter from those of the other ball bearing.

(b) The balls of the one ball bearing are made different in number from those of the other ball bearing.

(c) The balls of the one ball bearing are made different both in diameter and in number from those of the other ball bearing.

The above-described method (b) is advantageous in that the balls of the two ball bearings are equal in diameter, and the manufacture of those ball bearings can be achieved readily as much.

In the above-described embodiment, it goes without saying that each of the ball bearings can be increased in rigidity by changing the diameter of the balls or the size of the ball bearing itself.

Furthermore, in the above-described embodiment, only two ball bearings support the rotary shaft; however, the invention is not limited thereto or thereby. That is, the rotary shaft may be supported by a plurality of ball bearings, more than two ball bearings. In this case, too, the above-described methods may be employed for changing the frequencies of vibrations produced by the ball bearings.

Figure 8:
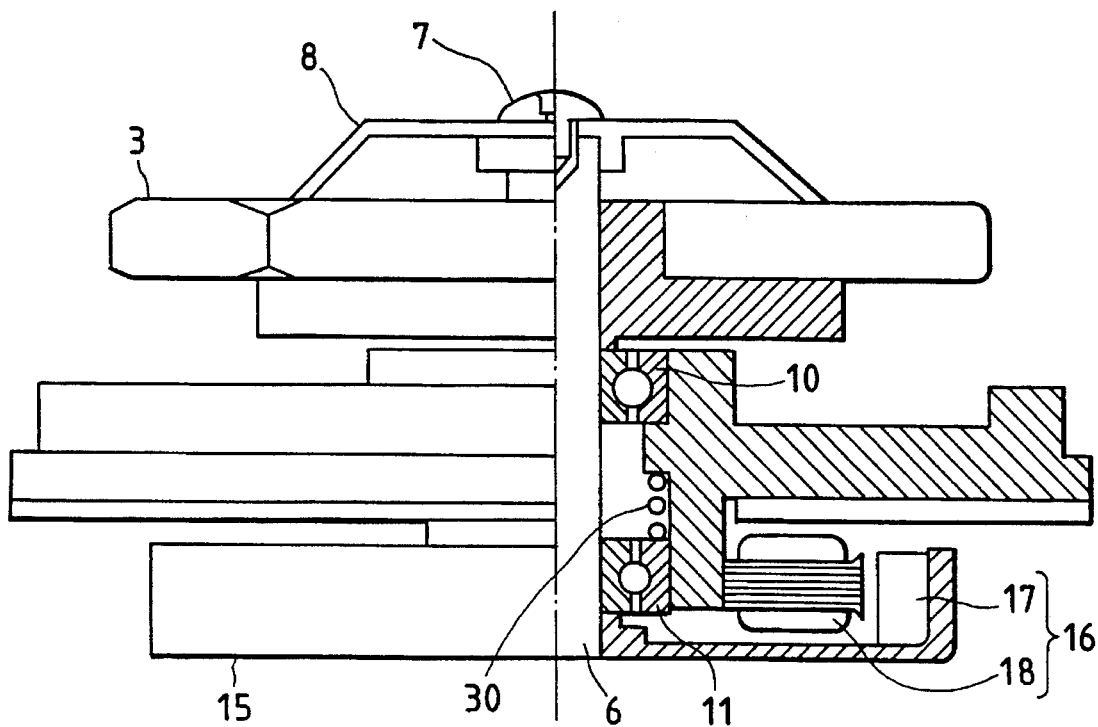
FIG. 8 is a side view, with its one half in vertical section, of another example of the light beam deflecting device, which constitutes a second embodiment of the invention.

A second embodiment of the invention is as shown in FIG. 8, in which parts corresponding functionally to those which have been described with reference to FIG. 1 are therefore designated by the same reference numerals or characters. The second embodiment is different from the first embodiment in the construction of a rotor for rotating the rotary polygon mirror and in the arrangement of the ball bearings.

In the second embodiment, the rotor 15 for rotating the rotary polygon mirror 3 is mounted on the lower end portion of the rotary shaft 6, and the magnets 17 forming the drive motor 16 are mounted on the inner cylindrical surface of the rotor 15. Two ball bearings 10 and 11 rotatably supporting the rotary shaft 6 are designed as follows: The inner races 20 and 21 are equal in inside diameter, and the outer races 22 and 23 are equal in outside diameter, and the balls 24 and 25 are different in diameter. The lower ball bearing 11 is pre-loaded by a coil spring 30. The other arrangements and functions are equal to those of the first embodiment described above.

Being constructed and functioning as described above, the light beam deflecting device of the invention is effectively prevented from producing beat sounds even when the rotary polygon mirror is rotated at high speed. Furthermore, the drive device of the invention is effectively prevented from producing beat sounds even when the rotary shaft of the drive device is rotated at high speed.

While there has been described in connection with the preferred embodiments of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A light beam deflecting device comprising:

a beam generator for generating a light beam;

a rotary polygon mirror for deflecting the light beam; and a plurality of ball bearing members for supporting a rotary shaft of said polygon mirror rotatably at respective different positions in a longitudinal direction of said rotary shaft, wherein said plurality of ball bearing members are so designed that any vibration which any one ball bearing member of said plurality of ball bearing members produces when rotated are different in frequency from any vibration which any other ball bearing member of said plurality of ball bearing members produces when rotated.

2. The light beam deflecting device as claimed in claim 1, wherein each of said ball bearing members includes an inner race, an outer race and a plurality of balls, said balls being held rotatably between said inner race and outer race.

3. A light beam deflecting device comprising:

a beam generator for generating a light beam;

a rotary polygon mirror for deflecting the light beam; and a plurality of ball bearing members for supporting a rotary shaft of said polygon mirror rotatably at respective different positions in a longitudinal direction of said rotary shaft, wherein said plurality of ball bearing members are so designed that any vibration which any one ball bearing member of said plurality of ball bearing members produces when rotated are different in frequency from any vibration which any other ball bearing member of said plurality of ball bearing members produces when rotated;

wherein said ball bearing members are not in contact with each other;

wherein each of said ball bearing members includes, an inner race, an outer race and a plurality of balls, said balls being held rotatably between said inner and outer race; and wherein said balls of any one ball bearing member of said plurality of ball bearing members are made different in diameter from those of any other ball bearing member of said plurality of ball bearing members.

4. A light beam deflecting device comprising:

a beam generator for generating a light beam;

a rotary polygon mirror for deflecting the light beam; and a plurality of ball bearing members for supporting a rotary shaft of said polygon mirror rotatably at respective different positions in a longitudinal direction of said rotary shaft, wherein said plurality of ball bearing members are so designed that any vibration which any one ball bearing member of said plurality of ball bearing members produces when rotated are different in frequency from any vibration which any other ball bearing member of said plurality of ball bearing members produces when rotated;

wherein said ball bearing members are not in contact with each other;

wherein each of said ball bearing members includes an inner race, an outer race and a plurality of balls, said balls being held rotatably between said inner and outer race; and wherein said balls of any one ball bearing member of said plurality of ball bearing members are made different in number from those of any other ball bearing member of said ball bearing members.

5. The light beam deflecting device as claimed in claim 4, wherein said balls of any one ball bearing member of said plurality of ball bearing members are made different in both diameter and in number from those of any other ball bearing member of said plurality of ball bearing members.

\* \* \* \* \*